(12) United States Patent
Sander et al.

(10) Patent No.: US 10,837,638 B2
(45) Date of Patent: Nov. 17, 2020

(54) HEAT SHIELD WITH AXIAL RETENTION LOCK

(71) Applicant: United Technologies Corporation, Hartford, CT (US)

(72) Inventors: David J. Sander, South Windsor, CT (US); Jonathan Lemoine, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 898 days.

(21) Appl. No.: 15/097,269

(22) Filed: Apr. 12, 2016

(65) Prior Publication Data

US 2017/0292702 A1     Oct. 12, 2017

(51) Int. Cl.
*F23R 3/00* (2006.01)
*F02C 7/24* (2006.01)
(Continued)

(52) U.S. Cl.
CPC .............. *F23R 3/002* (2013.01); *F01D 9/023* (2013.01); *F01D 11/005* (2013.01); *F01D 25/145* (2013.01); *F01D 25/243* (2013.01); *F01D 25/246* (2013.01); *F02C 7/24* (2013.01); *F23R 3/60* (2013.01); *F05D 2220/32* (2013.01); *F05D 2230/64* (2013.01); *F05D 2240/14* (2013.01); *F05D 2240/15* (2013.01);
(Continued)

(58) Field of Classification Search
CPC .. F23R 3/002; F23R 3/60; F01D 9/023; F01D 11/005; F01D 25/145; F01D 25/243; F01D 25/246; F02C 7/24; F05D 2220/32; F05D 2230/64; F05D 2230/642; F05D 2240/14; F05D 2240/15; F05D 2240/35; F05D 2250/294; F05D 2260/231; F05D 2260/30; F05D 2260/31; F05D 2260/941; F05D 2300/175
USPC ........................................................... 60/751
See application file for complete search history.

(56) References Cited

U.S. PATENT DOCUMENTS 4,191,011 A    3/1980  Sweeney et al.
4,302,940 A *  12/1981 Meginnis ................ F23R 3/002
                                                    416/231 A
(Continued)

FOREIGN PATENT DOCUMENTS

EP     2775102       9/2014
WO     2013165868    11/2013
WO     2014201247    12/2014

OTHER PUBLICATIONS

EP Search Report dated Jul. 27, 2017 in EP Application No. 17166102.8.
(Continued)

*Primary Examiner* — Jesse S Bogue
*Assistant Examiner* — Loren C Edwards
(74) *Attorney, Agent, or Firm* — Snell & Wilmer L.L.P.

(57) ABSTRACT

A heat shield assembly for an engine case of a gas turbine engine may include a heat shield and a support lock. The heat shield may have an annular shape and a groove formed circumferentially along an inner surface of the heat shield. The support lock may have a tab extending radially outward from a distal surface of the support lock. The groove in the heat shield may be configured to retain the tab of the support lock.

17 Claims, 6 Drawing Sheets

(51) Int. Cl.
    *F01D 11/00*     (2006.01)
    *F01D 9/02*     (2006.01)
    *F01D 25/24*     (2006.01)
    *F01D 25/14*     (2006.01)
    *F23R 3/60*     (2006.01)

(52) U.S. Cl.
    CPC .... *F05D 2240/35* (2013.01); *F05D 2250/294* (2013.01); *F05D 2260/231* (2013.01); *F05D 2260/30* (2013.01); *F05D 2260/31* (2013.01); *F05D 2260/941* (2013.01); *F05D 2300/175* (2013.01)

(56) References Cited

U.S. PATENT DOCUMENTS

| | | | |
|---|---|---|---|
| 5,238,365 A | 8/1993 | Petsche | |
| 7,234,306 B2 | 6/2007 | Aumont et al. | |
| 2002/0184892 A1 | 12/2002 | Galvez | |
| 2004/0036230 A1* | 2/2004 | Matsuda | F01D 9/023 277/632 |
| 2005/0000228 A1* | 1/2005 | De Sousa | F23R 3/007 60/796 |
| 2006/0010879 A1 | 1/2006 | Aumont | |
| 2010/0307166 A1 | 12/2010 | Woodcock | |
| 2013/0291544 A1* | 11/2013 | Eastwood | F23R 3/50 60/734 |

OTHER PUBLICATIONS

European Patent Office, European Search Report dated Jul. 28, 2017 in Application No. 17166212.5.
USPTO, Non-Final Office Action dated Nov. 1, 2018 in U.S. Appl. No. 15/097,275.
USPTO, Final Office Action dated Feb. 27, 2019 in U.S. Appl. No. 15/097,275.
USPTO, Advisory Action dated Apr. 22, 2019 in U.S. Appl. No. 15/097,275.
USPTO, Non-Final Action dated May 23, 2019 in U.S. Appl. No. 15/097,275.
USPTO, Final Action dated Aug. 28, 2019 in U.S. Appl. No. 15/097,275.
USPTO, Advisory Action dated Oct. 21, 2019 in U.S. Appl. No. 15/097,275.
USPTO, Non-Final Action dated Mar. 6, 2020 in U.S. Appl. No. 15/097,275.

* cited by examiner

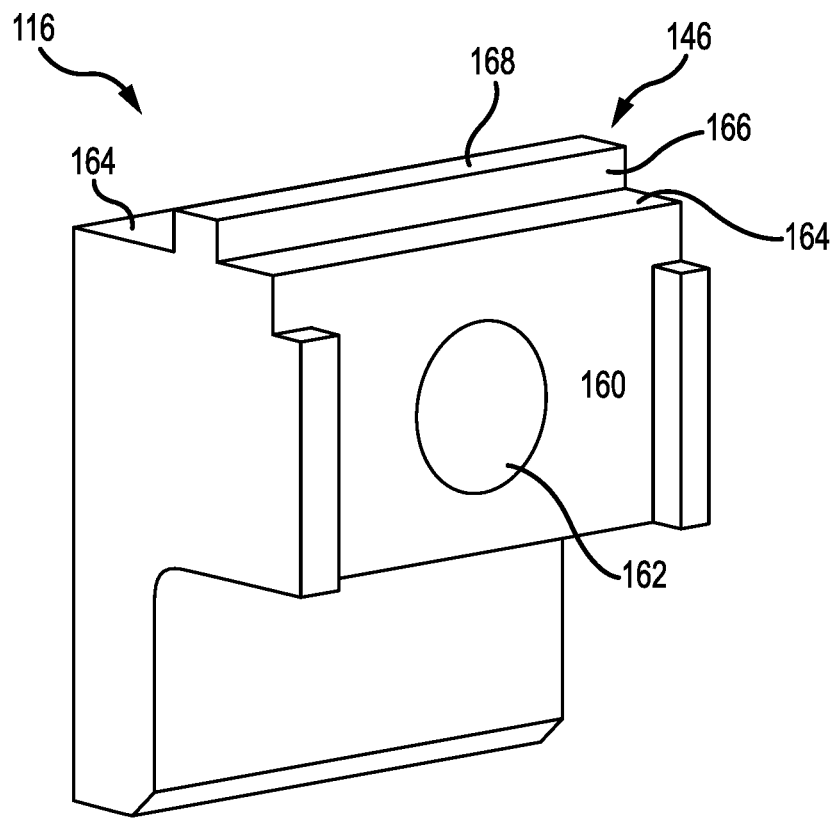
FIG.3C
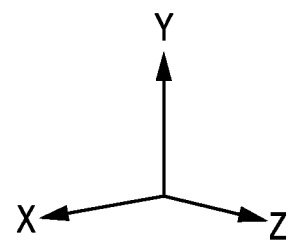

HEAT SHIELD WITH AXIAL RETENTION LOCK

FIELD

The present disclosure relates to gas turbine engines, and, more specifically, to a combustor section and engine case.

BACKGROUND

A gas turbine engine typically includes a fan section, a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

The combustor is typically coupled to an engine case of the gas turbine engine. The engine case may include a diffuser case, which circumscribes the compressor section. The diffuser case and fittings may be subjected to relatively high temperatures due to heat convectively transferred from the combustor to the diffuser case. Thermal loads in the diffuser case may cause thermal gradients that may stress, deform, fracture, and/or degrade portions of the diffuser case over time. A flange of the diffuser case may experience thermal gradients of 500° F. (260° C.) to 600° F. (315° C.). The thermal gradients cause stress that may shorten the operational life of engine case components.

SUMMARY

A heat shield assembly for an engine case of a gas turbine engine is described herein, in accordance with various embodiments. A heat shield assembly may include a heat shield and a support lock. The heat shield may have an annular shape and a groove formed circumferentially along an inner surface of the heat shield. The support lock may have a tab extending radially outward from a distal surface of the support lock. The groove in the heat shield may be configured to retain the tab of the support lock.

In various embodiments, a distal surface of the support lock may be configured to be coupled to the inner surface of the heat shield. The groove may extend partially through the heat shield. An outer surface of the heat shield may be continuous. The outer surface of the heat shield may form a seal with the engine case. The outer surface of the heat shield and an inner surface of the engine case may define a gap. In various embodiments, the engine case may be a diffuser case.

A combustor section of a gas turbine engine is also provided. The combustor section may include a combustor and a diffuser case disposed about the combustor. A heat shield may have an annular shape and a groove formed circumferentially along an inner surface of the heat shield. The heat shield may be disposed between the combustor and diffuser case.

In various embodiments, the heat shield may be configured to couple to the diffuser case. The heat shield may be disposed circumferentially along an inner surface of the diffuser case. An outer surface of the heat shield may form a seal with the inner surface of the diffuser case. The outer surface of the heat shield and the inner surface of the diffuser case may define a gap. The groove may extend partially through the heat shield and wherein an outer surface of the heat shield is continuous. A support lock may have a tab extending radially outward from a distal surface of support lock. The groove in the heat shield may be configured to retain the tab of the support lock. The support lock may be configured to couple to the diffuser case. The support lock and groove may be configured to retain heat shield in an axial direction.

A gas turbine engine is also provided. The gas turbine engine may include a combustor and a diffuser case disposed about the combustor. A heat shield assembly may be disposed between the combustor and diffuser case. The heat shield assembly may include a heat shield having an annular shape and a groove formed circumferentially along an inner surface of the heat shield. The heat shield assembly may further include a support lock having a tab extending radially outward from a distal surface of support lock. The groove in the heat shield is configured to retain the tab of the support lock.

In various embodiments, the heat shield may be disposed circumferentially along an inner surface of the diffuser case. An outer surface of the heat shield may form a seal with the inner surface of the diffuser case. The outer surface of the heat shield and the inner surface of the diffuser case may define a gap.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3C illustrates a perspective view of a support lock having an axial retention feature, in accordance with various embodiments.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
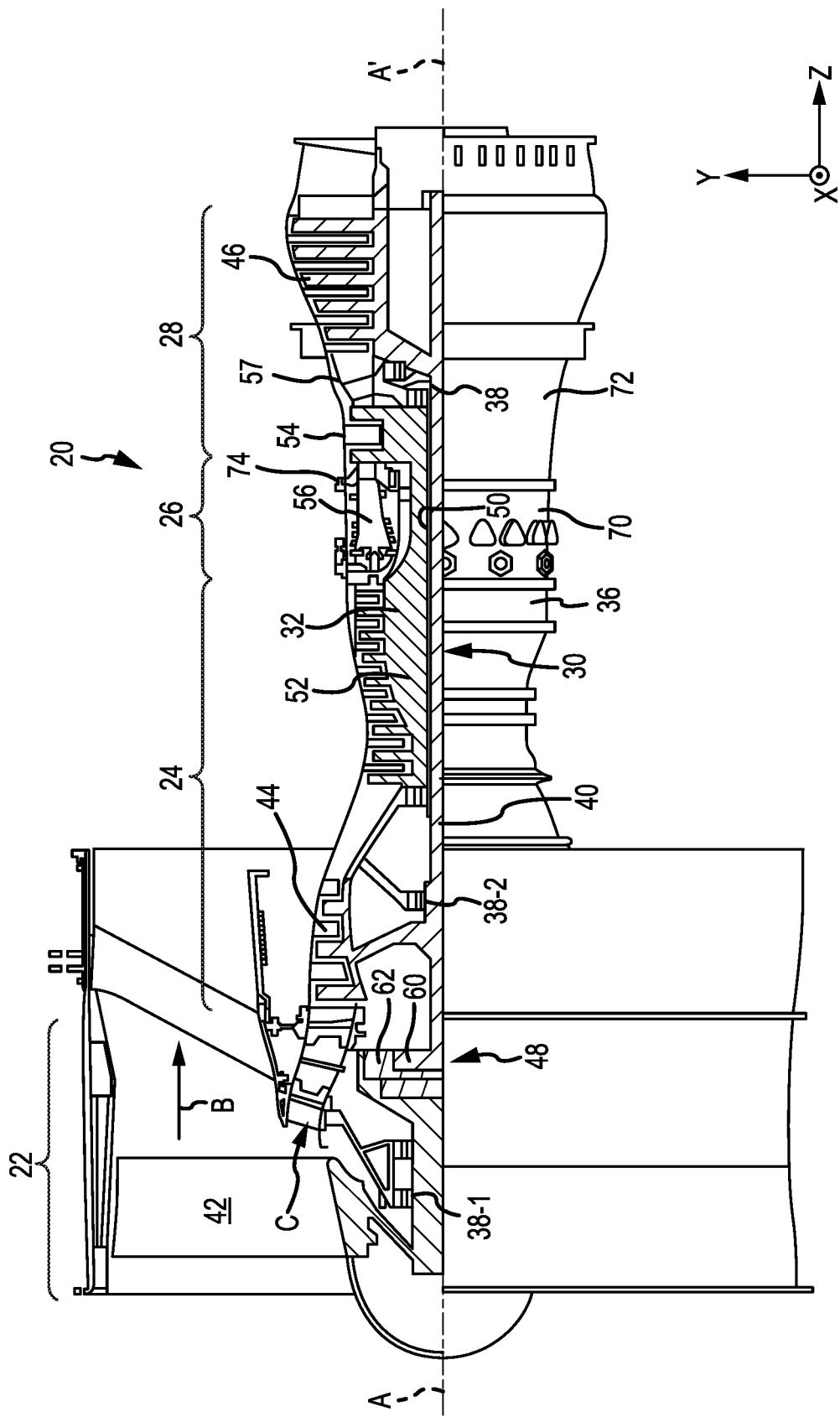
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30.

Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. An outer diffuser case 70 of engine static structure 36 may enclose the combustor 56. A high pressure turbine (HPT) case 72 of engine static structure 36 may enclose high pressure turbine 54. An aft end of outer diffuser case 70 may be attached to a forward end of HPT case 72 at an attachment interface 74. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

Figure 2:
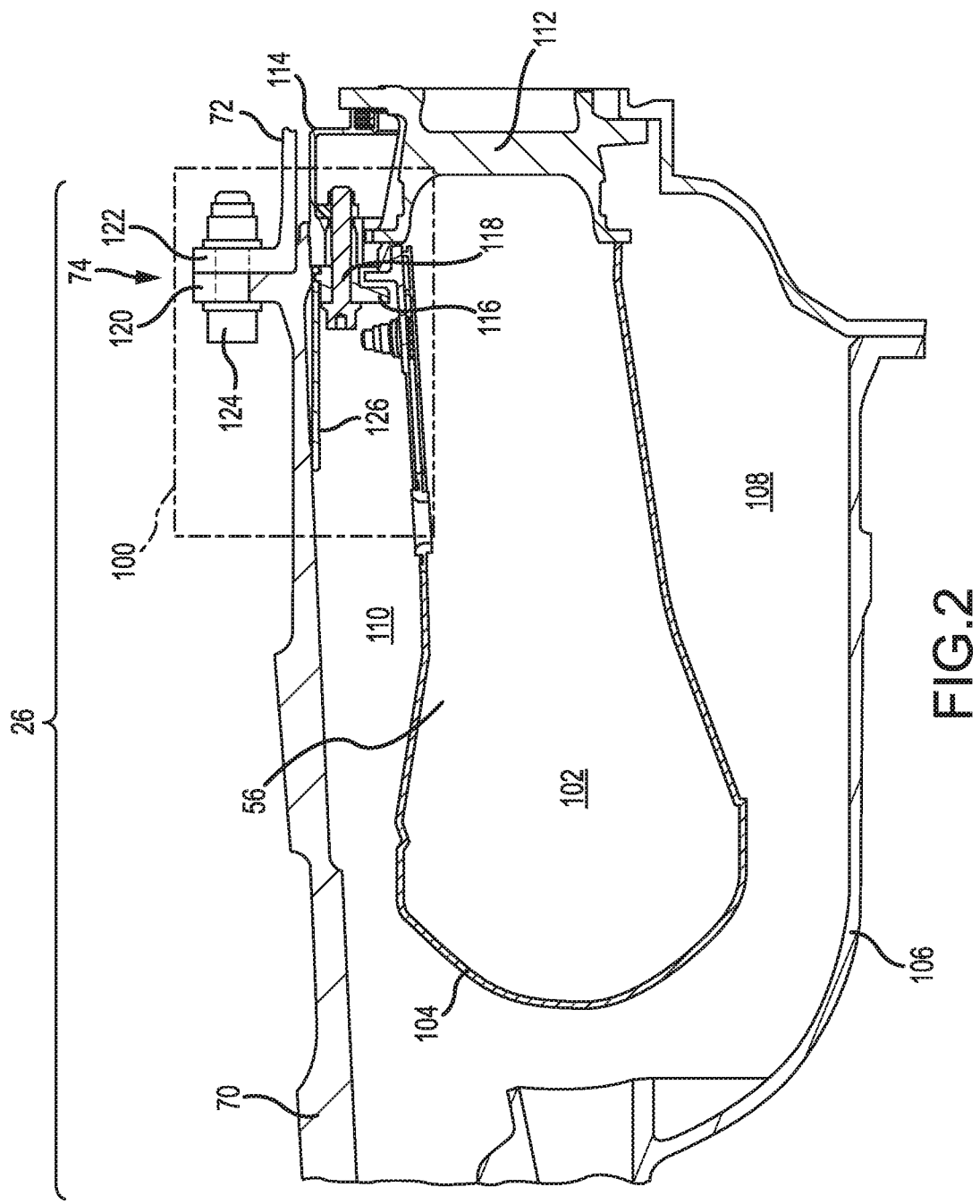
FIG. 2 illustrates a cross-sectional view of a combustor and a case of a gas turbine engine including a heat shield and an axial retention feature, in accordance with various embodiments.

With reference to FIG. 2, a combustor section 26 is shown, in accordance with various embodiments. Combustor section 26 generally includes combustor 56, which may be coupled to outer diffuser case 70 by a diffuser mount assembly 100. Combustor 56 generally includes a combustion chamber 102 defined by a combustor wall 104. Combustor 56 may be encased by outer diffuser case 70 having an annular geometry and disposed about combustor 56. Combustor 56 may be further encased by an inner diffuser case 106. Inner diffuser case 106 is spaced radially inward from combustor wall 104 to define an inner plenum 108. Outer diffuser case 70 is spaced radially outward from combustor wall 104 to define an outer plenum 110.

Referring briefly to FIG. 1, combustor 56 may be disposed downstream of the compressor section 24 to receive compressed airflow therefrom. Referring now to FIG. 2, Combustion chamber 102 contains the combustion products that flow axially toward turbine section 28. Gas leaving high pressure compressor 52 may flow into combustion chamber 102 to supply combustor 56 with air for combustion. Uncombusted gas may be mixed with fuel and burned in combustion chamber 102. Combusted gas in combustor 56 may reach or exceed temperatures of up to 3,500° F. (1,925° C.) or higher. Heat may radiate from combustor 56 to other nearby components which may cause the nearby components to increase in temperature.

With momentary reference to FIG. 1, turbine section 28 receives combusted gas or exhaust from combustor section 26. In various embodiments, turbine section 28 may include multiple rows of vanes and multiple rows of blades that can rotate about an axis with respect to the vanes. Combusted gas from the combustor section 26 is channeled to the turbine section where it can be directed through the turbine vanes and blades. With reference to FIGS. 1 and 2, high pressure turbine 54 may include a plurality of vanes, such as vane 112, and a plurality of blades. Vane 112 may operate as a first stage high pressure turbine vane of high pressure turbine 54. Vane 112 and combustor 56 may attach to outer diffuser case 70 by a combustor vane support 114. Combustor 56 may be further secured to outer diffuser case 70 and combustor vane support 114 by a plurality of support locks 116. In various embodiments, diffuser mount assembly 100 includes a plurality of support locks 116 disposed at regular intervals circumferentially around combustor 56. Each support lock 116 and combustor vane support 114 may be configured to receive a fastener 118. A fastener 118 may be passed through combustor vane support 114 and support lock 116 to mechanically couple support lock 116 to combustor vane support 114.

In various embodiments, outer diffuser case 70 may be attached to HPT case 72. Outer diffuser case 70 may include a diffuser case flange 120 extending radially from outer diffuser case 70 at or near the aft end of outer diffuser case 70. HPT case 72 may include an HPT case flange 122 extending radially from HPT case 72 at or near the forward end of HPT case 72. Diffuser case flange 120 and HPT case flange 122 may mate together at attachment interface 74. Flanges 120, 122 may be in directly abutting engagement with each other at attachment interface 74 and may be secured by a plurality of fasteners 124. Fasteners 124 may be passed through flanges 120, 122 to mechanically couple outer diffuser case 70 and HPT case 72. Fasteners 124 may include rivets, bolts, or other suitable fasteners to couple outer diffuser case 70 and HPT case 72 along flanges 120, 122.

Heat radiating from combustor 56 may introduce thermal loads on outer diffuser case 70 and diffuser case flange 120. For example, heat may convectively transfer from combustor 56 to outer diffuser case 70 and to diffuser case flange 120, resulting in a thermal gradient in diffuser case flange 120. A heat shield 126 may be configured to block heat radiating from combustor 56 from directly impinging on outer diffuser case 70 and on diffuser case flange 120. Heat shield 126 may be disposed between combustor 56 and outer diffuser case 70. In various embodiments, a heat shield 126 may extend circumferentially along an inner wall of outer diffuser case 70. Heat shield 126 may help reduce the thermal gradients in diffuser mount flange 120, thereby reducing stress on diffuser case flange 120.

Figure 3A:
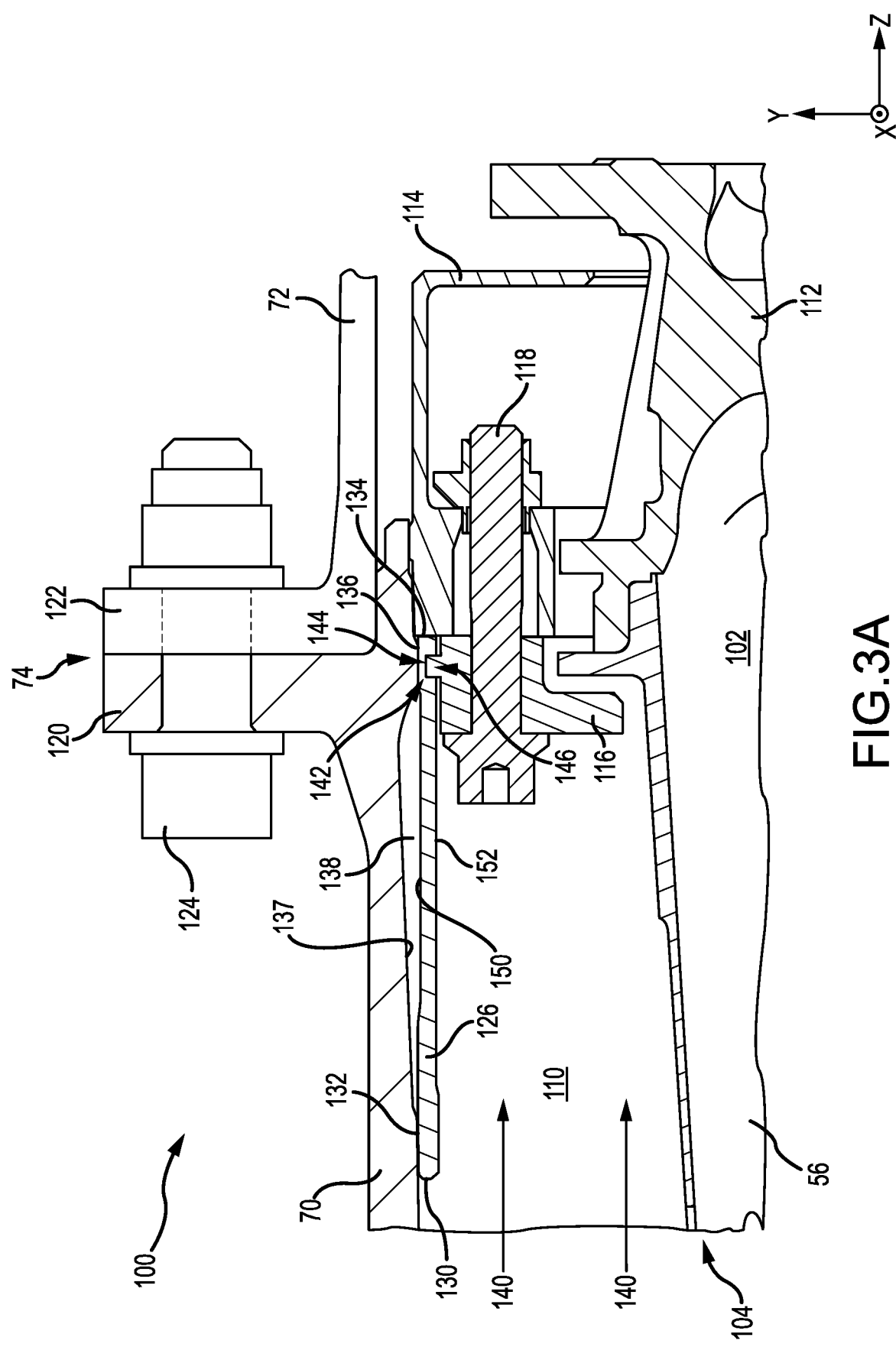
FIG. 3A illustrates a cross-sectional view of a diffuser case flange having a heat shield, in accordance with various embodiments.

With reference to FIG. 3A, a cross-sectional view of diffuser mount assembly 100 is shown with heat shield 126, in accordance with various embodiments. Heat shield 126 may be used to insulate outer diffuser case 70 and diffuser case flange 120 from convective heat transfer from combustor 56 through gas flowing through outer plenum 110. In various embodiments, a forward end 130 of heat shield 126 may contact outer diffuser case 70 at a contact surface 132. An aft end 134 of heat shield 126 may further contact outer diffuser case 70 at a contact surface 136. Heat shield 126 may form a seal with outer diffuser case 70 at contact surface 132 and contact surface 136. Contact surfaces 132, 136 may each form an annular seal disposed circumferentially along an inner surface of outer diffuser case 70. In various embodiments, an outer surface 150 of heat shield 126 and an inner surface 137 of outer diffuser case 70 define a gap 138, which is disposed between heat shield 126 and outer diffuser case 70. A portion of heat shield 126 may be configured to be separated from outer diffuser case 70 by gap 138. Gap 138 may extend axially and circumferentially along heat shield 126 between contact surfaces 132, 136. Gap 138 may be configured such that a conductive thermal path does not exist between heat shield 126 and outer diffuser case 70 at gap 138. Gap 138 may be configured to minimize convective heat transfer between heat shield 126 and outer diffuser case 70. Accordingly, heat shield 126 may be configured to minimize convective heat transfer between combustor 56 and outer diffuser case 70, thereby decreasing the temperature of diffuser case flange 120. The reduced temperature of diffuser case flange 120 reduces thermal gradients and stress experienced by diffuser case flange 120 and increases the operational life of diffuser case flange 120.

Core airflow C generally flows through combustor section 26 in the direction of arrows 140. During a surge event, core airflow C may backflow or may travel in a direction other than in the direction of arrows 140. Backflow of core airflow C can disrupt the position of engine components and may lead to liberation of heat shield 126 (e.g., heat shield 126 may loosen or detach from outer diffuser case 70), increasing the risk of damage to the surrounding engine structure. An axial retention feature 142 may be included to prevent axial liberation of heat shield 126, particularly during a surge event. In various embodiments, axial retention feature 142 may include a groove 144 in heat shield 126 configured to receive a tab 146 of support lock 116. Groove 144 may be a channel formed partially through an inner surface 152 of heat shield 126. In various embodiments, tab 146 of support lock 116 may fit within groove 144 of heat shield 126 to reduce movement of heat shield 126 or to prevent heat shield 126 from moving axially in the z direction. Support lock 116 may be secured to combustor vane support 114 by fastener 118, and tab 146 of support lock 116 secures heat shield 126 to combustor vane support 114 with respect to axial motion.

Figure 3B:
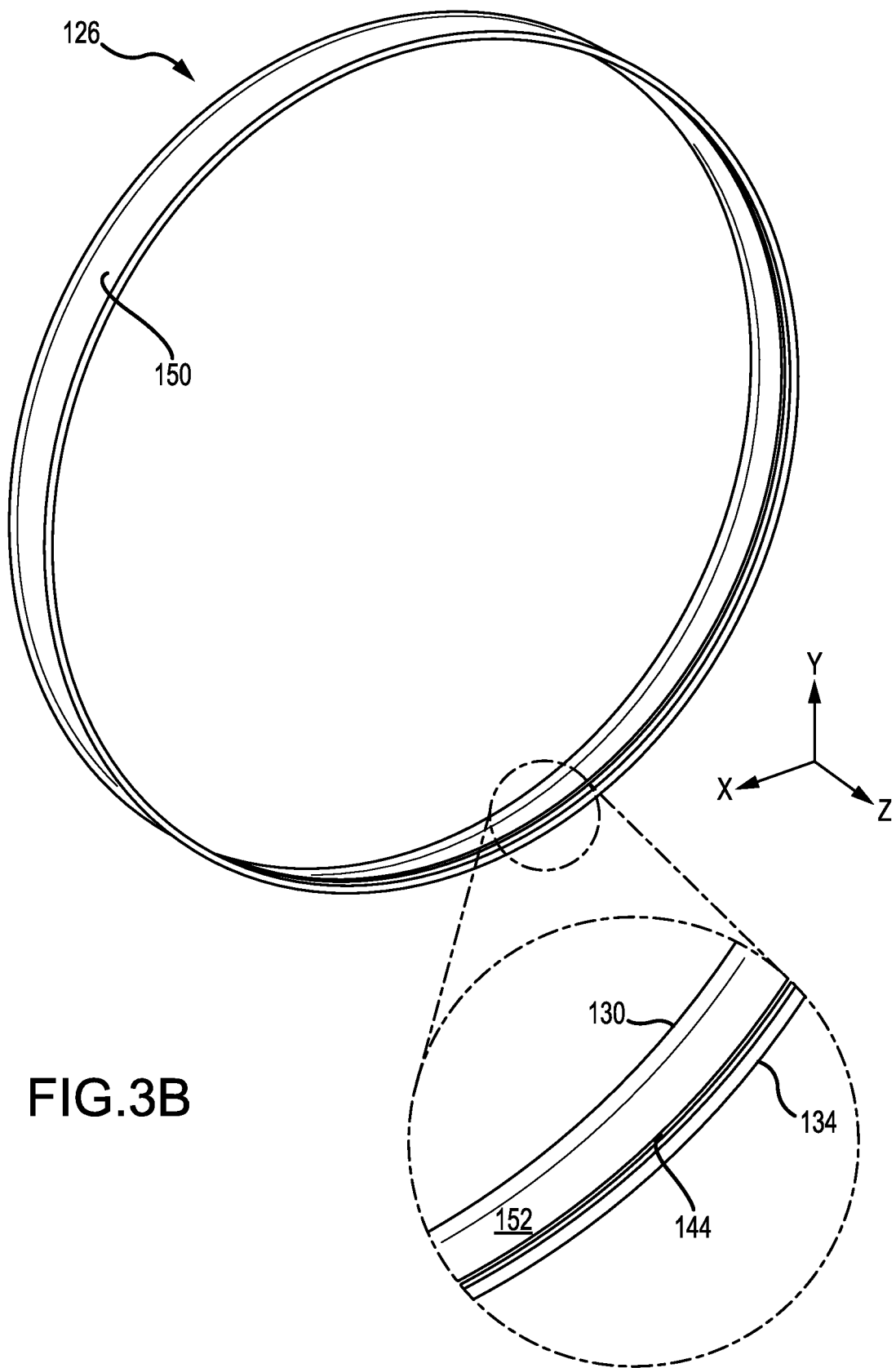
FIG. 3B illustrates a perspective view of a heat shield, in accordance with various embodiments.

With reference to FIG. 3B, a perspective view of heat shield 126 is shown in accordance with various embodiments. In various embodiments, heat shield 126 may be circumferentially continuous (e.g., annular or ring shaped). Heat shield 126 having annular geometry may interface with and fit within outer diffuser case 70, which may also have annular geometry. Heat shield 126 includes an outer surface 150 and an inner surface 152. An inner surface 152 of heat shield 126 may include groove 144 extending circumferentially along inner surface 152. Groove 144 may extend radially outward from inner surface 152 into heat shield 126 to a depth of up to or greater than 50% of a thickness of heat shield 126. Groove 144 may be formed in proximity to aft end 134 of heat shield 126. Heat shield 126 with groove 144 may be a continuous structure.

In various embodiments, heat shield 126 may be manufactured using sheet metal, forging, casting, additive manufacturing, machining or the like. Groove 144 may further be formed by milling, electrochemical machining (ECM), or electrostatic discharge machining (EDM) as desired, for example. It is desirable for the material of heat shield 126 to be resistant to heat. In that regard and in various embodiments, heat shield 126 may include a high performance nickel-based super alloy or other suitable material.

With reference to FIG. 3C, a perspective view of support lock 116 is shown with an axial retention feature, in accordance with various embodiments. In various embodiments, support lock 116 may be configured to interface with combustor vane support 114 at a mating surface 160. Support lock 116 may be configured to receive a fastener, for example, within opening 162. Support lock 116 may be further configured with a distal surface 164 having tab 146 extending radially outward from distal surface 164. Tab 146 is depicted with a rectangular shape having side surfaces 166 and a top surface 168. Tab 146 may operate as a first axial retention feature of support lock 116 and may be configured to complement and interface with a second axial retention feature, such as groove 144, of heat shield 126. While the first axial retention feature, or tab 146, of support lock 116 is depicted as rectangular in shape, it is to be understood that any shape complementary to the second axial retention feature, or groove 144, of heat shield 126 may be used.

In various embodiments, support lock 116 may be manufactured by forging, casting, additive manufacturing, machining such as ECM, EDM or the like. In various embodiments, support lock 116 may include an austenitic nickel-chromium-based alloy, a high performance nickel-based super alloy, or other suitable material.

Figure 3D:
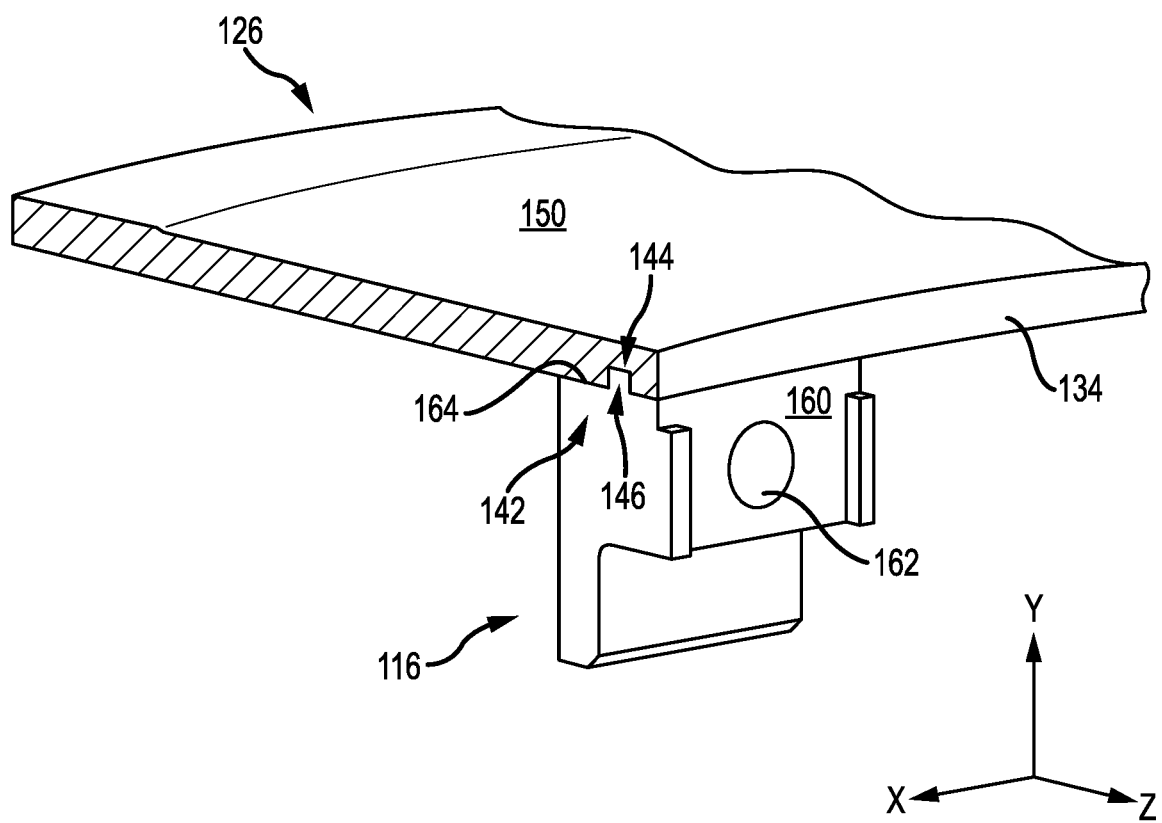
FIG. 3D illustrates a perspective view of a heat shield and support lock, in accordance with various embodiments.

With reference to FIG. 3D, a perspective view of a heat shield assembly 170 is shown with axial retention feature 142, in accordance with various embodiments. In various embodiments, heat shield assembly 170 may include heat shield 126 and support lock 116. In various embodiments, heat shield assembly 170 may further include axial retention feature 142. Axial retention feature 142 may comprise groove 144 and tab 146. In various embodiments, tab 146 may extend radially outward and integrally from distal surface 164 of support lock 116. Tab 146 may engage with groove 144 to prevent axial liberation of heat shield 126. Tab 146 of support lock 116 may fit into groove 144 of heat shield 126 such that tab 146 extends partially into heat shield 126. An interference fit may be formed between tab 146 and groove 144 to help retain heat shield 126 in a position along the z axis. In various embodiments, heat shield 126 may be integral to (e.g., forged or manufactured as part of) support lock 116. Groove 144 extends partially through heat shield 126 and does not extend completely through heat shield 126 thereby leaving outer surface 150 of heat shield 126 continuous. As a continuous structure, heat shield 126 may provide improved thermal shielding performance.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield assembly for an engine case of a gas turbine engine, comprising:
   a heat shield having an annular shape about an axis and a groove formed circumferentially about this same axis along an inner surface of the heat shield, the groove comprising a first axially facing surface and a second axially facing surface that are spaced from one another in a dimension corresponding with the axis, and wherein the groove extends partially through the heat shield in a direction of an outer surface of the heat shield and terminates prior to reaching the outer surface of the heat shield such that the groove fails to extend completely through the heat shield; and
   a support lock having a tab extending radially outward from a distal surface of the support lock, the tab comprising a first axially facing surface and a second axially facing surface, the support lock comprising an opening extending axially through the support lock, wherein the groove in the heat shield is configured to retain the tab of the support lock, and wherein the first axially facing surface of the groove is configured to contact the first axially facing surface of the tab and the second axially facing surface of the groove is configured to contact the second axially facing surface of the tab to prevent axial movement of the heat shield relative to the support lock.

2. The heat shield assembly of claim 1, wherein the distal surface of the support lock is configured to be coupled to the inner surface of the heat shield.

3. The heat shield assembly of claim 2, wherein the tab comprises a distal surface that extends between the first axially facing surface and the second axially facing surface, wherein the distal surface of the tab is spaced from the outer surface of the heat shield in the direction of the inner surface of the heat shield.

4. The heat shield assembly of claim 3, wherein the outer surface of the heat shield forms a seal with the engine case.

5. The heat shield assembly of claim 4, wherein the outer surface of the heat shield and an inner surface of the engine case define a gap.

6. The heat shield assembly of claim 1, wherein the engine case comprises a diffuser case.

7. A combustor section of a gas turbine engine, comprising:
a combustor;
a diffuser case disposed about the combustor;
a heat shield having an annular shape about an axis and a groove formed circumferentially about this same axis along an inner surface of the heat shield, the heat shield disposed between the combustor and the diffuser case, the groove comprising a first axially facing surface and a second axially facing surface that are spaced from one another in a dimension corresponding with the axis, and wherein the groove extends partially through the heat shield in a direction of an outer surface of the heat shield and terminates prior to reaching the outer surface of the heat shield such that the groove fails to extend completely through the heat shield; and
a support lock having a tab extending radially outward from a distal surface of the support lock, the tab comprising a first axially facing surface and a second axially facing surface, the support lock comprising an opening extending axially through the support lock, wherein the first axially facing surface of the groove is configured to contact the first axially facing surface of the tab and the second axially facing surface of the groove is configured to contact the second axially facing surface of the tab to prevent axial movement of the heat shield relative to the support lock.

8. The combustor section of claim 7, wherein the combustor comprises a combustor wall, wherein the heat shield is disposed between the combustor wall and the diffuser case proceeding radially outwardly relative to the axis, and wherein there is a space between the combustor wall and the heat shield proceeding radially outwardly from the combustor wall, relative to the axis, and in the direction of the heat shield and the diffuser case.

9. The combustor section of claim 7, wherein the heat shield is disposed circumferentially along an inner surface of the diffuser case.

10. The combustor section of claim 9, wherein an outer surface of the heat shield forms a seal with the inner surface of the diffuser case.

11. The combustor section of claim 10, wherein the outer surface of the heat shield and the inner surface of the diffuser case define a gap.

12. The combustor section of claim 7, wherein the support lock is configured to couple to the diffuser case.

13. The combustor section of claim 12, wherein the support lock and the groove are configured to retain the heat shield in an axial direction.

14. A gas turbine engine, comprising:
a combustor;
a diffuser case disposed about the combustor; and
a heat shield assembly disposed between the combustor and the diffuser case, the heat shield assembly comprising:
a heat shield having an annular shape about an axis and a groove formed circumferentially about this same axis along an inner surface of the heat shield, the groove comprising a first axially facing surface and a second axially facing surface that are spaced from one another in a dimension corresponding with the axis, and wherein the groove extends partially through the heat shield in a direction of an outer surface of the heat shield and terminates prior to reaching the outer surface of the heat shield such that the groove fails to extend completely through the heat shield; and
a support lock having a tab extending radially outward from a distal surface of the support lock, the tab comprising a first axially facing surface and a second axially facing surface, the support lock comprising an opening extending axially through the support lock, wherein the groove in the heat shield is configured to retain the tab of the support lock, and wherein the first axially facing surface of the groove is configured to contact the first axially facing surface of the tab and the second axially facing surface of the groove is configured to contact the second axially facing surface of the tab to prevent axial movement of the heat shield relative to the support lock.

15. The gas turbine engine of claim 14, wherein the heat shield is disposed circumferentially along an inner surface of the diffuser case, and wherein an outer surface of the heat shield forms a seal with the inner surface of the diffuser case.

16. The gas turbine engine of claim 15, wherein the outer surface of the heat shield and the inner surface of the diffuser case define a gap.

17. The gas turbine engine of claim 14, wherein the combustor comprises a combustor wall, wherein the heat shield is disposed between the combustor wall and the diffuser case proceeding radially outwardly relative to the axis, and wherein there is a space between the combustor wall and the heat shield proceeding radially outwardly from the combustor wall, relative to the axis, and in the direction of the heat shield and the diffuser case.

* * * * *